US010083199B1

(12) United States Patent
Sharma et al.

(10) Patent No.: US 10,083,199 B1
(45) Date of Patent: Sep. 25, 2018

(54) DATA MIGRATION IN ACTIVE DATA STORE (71) Applicant: Sprint Communications Company L.P., Overland Park, KS (US)

(72) Inventors: Anuj Sharma, Broadlands, VA (US); Steven T. Griffin, Leesburg, VA (US); Deepesh Belwal, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 270 days.

(21) Appl. No.: 15/162,262

(22) Filed: May 23, 2016

(51) Int. Cl.
*G06F 17/30* (2006.01)
*G06F 3/06* (2006.01)

(52) U.S. Cl.
CPC ........ *G06F 17/30362* (2013.01); *G06F 3/067* (2013.01); *G06F 3/0619* (2013.01); *G06F 3/0647* (2013.01); *G06F 17/30185* (2013.01); *G06F 17/30371* (2013.01)

(58) Field of Classification Search
CPC ......... G06F 17/30362; G06F 17/30371; G06F 17/30185; G06F 3/067; G06F 3/0647; G06F 3/0619
USPC ................................................. 707/703, 704
See application file for complete search history.

(56) References Cited

U.S. PATENT DOCUMENTS

| | | | | |
|---|---|---|---|---|
| 7,730,258 B1* | 6/2010 | Smith | .................... | G06F 3/0622 711/114 |
| 9,858,200 B1* | 1/2018 | Griffin | ................ | G06F 12/1027 |
| 2008/0172670 A1* | 7/2008 | Corrigan | ................. | G06F 9/526 718/104 |
| 2014/0136502 A1* | 5/2014 | Mohamed | ................ | G06F 9/52 707/704 |
| 2016/0098438 A1* | 4/2016 | Eberlein | ........... | G06F 17/30362 707/704 |

OTHER PUBLICATIONS

Zhengyu He et al., On the Performance of Commit-Time-Locking Based Software, IEEE International Conference on High Performance Computing and Communications, pp. 180-187 (Year: 2009).*
Sharma, Anuj, et al., "Data Migration Between Different Lightweight Directory Access Protocol (LDAP) Based Wireless Communication Subscriber Data Stores," filed Jan. 6, 2017, U.S. Appl. No. 15/399,798.

* cited by examiner

*Primary Examiner* — Greta L Robinson (57) ABSTRACT

A method of migrating data entries stored in a distributed data store from a source memory device of the data store to a target memory device of the data store. The method comprises locking a data entry in the source memory with a soft locking mechanism by an application executing on a computer system, reading the data entry in the source memory by the application, cloning the data entry in a shadow journal in the target memory by the application, launching a plurality of alias redirection threads by the application, where each remaps one of a plurality of aliases of the data entry from referencing the location of the data entry in the source memory to referencing the location of the data entry in the target memory, and committing the data entry in the shadow journal to the target memory by the application.

19 Claims, 3 Drawing Sheets

DATA MIGRATION IN ACTIVE DATA STORE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A very large data store system may be implemented as a distributed data store such that data is stored on a plurality of separate memory devices, for example separate disk drives. Such disk drives are sometimes referred to as back end data storage. Client applications may read and write the data in the distributed data stores, and the distributed data store may map these access requests to the appropriate memory devices. As the number of data entries in the data store may increase over time, it may be desirable to add one or more additional memory devices and redistribute some of the data entries from legacy memory devices to the one or more additional or new memory devices. Sometimes memory devices may be decommissioned and/or removed from service as the device exceeds an expected service life or as the device begins to experience failures. In case of memory device decommissioning or removal, the data entries on the subject memory device may desirably be migrated to other memory devices.

SUMMARY

In an embodiment, a method of migrating a plurality of data entries stored in a distributed data store from a source memory device of the distributed data store to a target memory device of the distributed data store while the distributed data store is receiving client data access requests is disclosed. The method comprises locking a data entry in the source memory device with a soft locking mechanism, where the locking is performed by an application executing on a computer system, reading the data entry in the source memory device by the application, and cloning the data entry in a shadow journal in the target memory device by the application. The method further comprises launching a plurality of alias redirection threads by the application, where each remaps one of a plurality of aliases of the data entry from referencing the location of the data entry in the source memory device to referencing the location of the data entry in the target memory device and committing the data entry in the shadow journal to the target memory device by the application.

In another embodiment, a data migration system is disclosed. The data migration system comprises a processor, a non-transitory memory, and an application stored in the non-transitory memory. When executed by the processor, the application executes a plurality of distributed data store data entry migration threads, where at least some of the migration threads migrate a data entry from a source memory device to a target memory device in an atomic transaction in which the migration thread, locks the data entry in the source memory device with a soft locking mechanism, wherein the soft locking mechanism comprises the migration thread releasing the lock on the data entry when a client requests one of a non-transactional update to the data entry or a transaction on the data entry, where the client is different from the application. The migration thread further reads the data entry in the source memory device, clones the data entry in a shadow journal in the target memory device, launches a plurality of alias redirection threads that each remaps one of a plurality of aliases of the data entry from referencing the location of the data entry in the source memory device to referencing the location of the data entry in the target memory device, and if a client request to access the data entry has not been received, commits the data entry in the shadow journal to the target memory device.

In yet another embodiment, a method of migrating a plurality of data entries stored in a distributed data store from a source memory device of the distributed data store to a target memory device of the distributed data store while the distributed data store is receiving client data access requests is disclosed. The method comprises locking a data entry in the source memory device with a soft locking mechanism, where the locking is performed by an application executing on a computer system, reading the data entry in the source memory device by the application, and cloning the data entry in a shadow journal in the target memory device by the application. The method further comprises launching a plurality of alias redirection threads by the application, where each remaps one of a plurality of aliases of the data entry from referencing the location of the data entry in the source memory device to referencing the location of the data entry in the target memory device, after remapping the aliases of the data entry, rereading the data entry in the source memory device and writing any changes to the data entry in the target memory device by the application, and after rereading the data entry in the source memory device, committing the data entry in the shadow journal to the target memory device by the application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Large data stores may be implemented using several memory devices, for example a plurality of disk drive devices. Maintaining such large data stores can pose a variety of challenges. Maintenance can include decommissioning and removing from service an aged, failed, or struggling memory device. A "struggling" memory device may be a memory device that has not totally failed but is experiencing failures at an increasing frequency. In this case, the data on the memory device is desirably copied or migrated to other memory devices already in the data store or to a new memory device that is being added to the data store. Maintenance can include expanding the data store by the addition of new memory devices, for example when the volume of data grows beyond the capacity of the deployed memory devices (or beyond a desired maximum threshold of available capacity, for example beyond 85% of available capacity). In this case, a portion of the data on each of the already deployed memory devices may be copied or migrated to one or more new memory devices. The present disclosure teaches a system and method for migrating data in a large data store.

One of the challenges of data migration is continuing to provide access to the data in the data store for client applications during the data migration activity. Another of the challenges is to migrate the data in a way that is transparent to client applications and places no adaptation or redesign burden on those client applications. Another of the challenges is to migrate the data without corrupting the data or losing the data. The difficulty of these challenges can be increased by scale factors. For example, in an embodiment, the data migration system acts upon a large data store that comprises in excess of 50 million data entries and which is accessed by clients at a rate in excess of 250,000 access requests per second during peak usage periods.

In an embodiment, the data migration system migrates data entries from a first memory device, referred to as a source memory device, to one or more other memory devices, referred to as a target memory device or devices. It will be appreciated that the data migration system is able to migrate data from one source device to one target device, from one source device to a plurality of target devices, from a plurality of source devices to a plurality of target devices, and/or from a plurality of source devices to a single target device. In some cases, one or more of the target devices may be new memory devices that are being added to the data store. The data migration system beneficially supports these difference operations flexibly and supports combinations of these operations.

In an embodiment, the data store is a distributed data store comprising a plurality of memory devices. A data store access broker application executes on one or more server computers and extends an application programming interface (API) used by a plurality of client applications executing on client servers to read and write the data entries in the distributed data store. A data migration application executes on one or more server computers to migrate data from one or more source memory devices to one or more target memory devices, while the client applications are actively reading and writing entries in the distributed data store. In an embodiment, the data entries in the distributed data store are structured as light-weight directory access protocol (LDAP) tree objects, and the data store access broker application extends an LDAP API to client applications for accessing the distributed data store. In other embodiments, however, different data store architectures, protocols, and APIs may be used.

The data migration application launches a plurality of concurrent data migration threads. Each data migration thread migrates one data entry (e.g., one LDAP data tree object which may comprise multiple sub-trees) from a source memory device to a target memory device. While the description below describes the processing associated with a single data migration thread, it is understood that a plurality of other data migration threads are concurrently migrating different data entries in parallel with the data migration thread being described. Defining what data entries in the distributed data store are to be migrated from what source memory device or devices to what target memory device or devices may be referred to as a data migration map and can be considered to be an input to the data migration application. Generation of the data migration map can be accomplished in any desired manner and is not discussed further hereinafter.

When a data migration thread executes, it sets a soft lock on a data entry in the source memory device. A soft locking mechanism may be provided by the data store access broker API. When a data entry is locked (with a soft lock) by the data migration thread, and a client application requests to access the same data entry through the data store access broker API (i.e., to request a non-transactional update of the data entry), the data store access broker notifies the data migration thread. In an embodiment, this notification may be effected by interrupting the data migration thread. The data migration thread, when interrupted in this way, backs out of its ongoing data entry migration and releases the soft lock. Backing out entails deleting its in-progress migration of the data entry to the target memory device, leaving the data entry in the source memory device unchanged. The data migration application will retry data migration for this data entry at a later time. The client application that requested access to the data entry is granted the requested access and is not affected by the soft lock that had been placed on the data entry by the data migration thread.

The data migration thread reads the data entry in the source memory device, and it clones or copies the data entry to the target memory device in a contingent state or in a shadow journal structure of that target memory device. A shadow journal may be conceptualized as a portion of the memory that is not exposed to our accessible to the outside world (user applications or front end applications) until the data migration transaction has been committed. The data migration thread then sets a soft lock on the data entry in the source memory device (alternatively, in another embodiment, the data migration thread may set the soft lock before it reads the data entry in the source memory device). The data migration thread launches a plurality of new threads, each of which is responsible for remapping one alias reference to the data entry from identifying a memory location in the source memory device to identifying instead a memory location in the target memory device. These threads launched by the data migration thread may be referred to as alias remapping threads. As is understood by those skilled in the art, an alias may be used by a client application to access data entries in a distributed data store, and the data store access broker may map the alias to the actual memory location in the distributed data store based on the alias references. Aliases are a form of indirect addressing. By performing the remapping of alias references using parallel alias remapping threads, this sensitive operation can be reduced in time duration versus the alternative of remapping alias references serially. After remapping its alias reference, each alias remapping thread terminates. In an embodiment, the data migration thread may reread the data entry in the source memory device, confirm that no changes have been made or update the data entry in the shadow journal accordingly if the data entry has changed. The processing of reading, cloning, locking, remapping aliases, confirming may be performed in an atomic transaction. Said in other words, if something goes awry, the data migration thread can restore the source memory device and the data entry and original alias references to their state before the data migration thread began its processing. The soft lock on the data entry in the source memory device is then released by the data migration thread. The data migration thread then deletes the data entry from the source memory device (in successful scenario).

The data migration system described above, and described in further detail below, is inextricably tied to computer technology because of the large volume of electronic data that is involved and the ongoing, high rate access to this electronic data by client applications. The data migration system is an improvement of existing computer technology because it speeds the process of data entry migration significantly and reduces the risk of corrupting data entries during the data migration process while still allowing access to the stored data by applications rather than shutting down access to the stored data for an extended maintenance window. For example, in an embodiment, each data entry is associated with thirteen aliases, and about 40 mS is consumed in remapping an alias. If the thirteen aliases are remapped by parallel threads, remapping consumes about 40 mS total. If the thirteen aliases are remapped serially—one after the other—remapping consumes about 520 mS. In an embodiment, the data migration system and method taught herein may reduce the time consumed in migrating a single data entry from about 4 seconds to about 100 mS. This, too, may be seen as beneficially supporting flexible migration of data.

In an embodiment, the data migration system may be applied to a large distributed data store of wireless communication subscription data entries and may be accessed at a high frequency to authenticate network access requests by mobile communication devices to receive wireless communication service (e.g., place a voice call from a cell phone or conduct a data session such as an Internet browser session from a cell phone). The data migration system taught herein can support adding new memory devices to the distributed data store as new subscribers are added without impacting authentication of subscribers requesting access to the wireless communication infrastructure and without "breaking" the subscription records of users which may result in a subscriber being denied wireless communication service they ought to receive.

Figure 1:
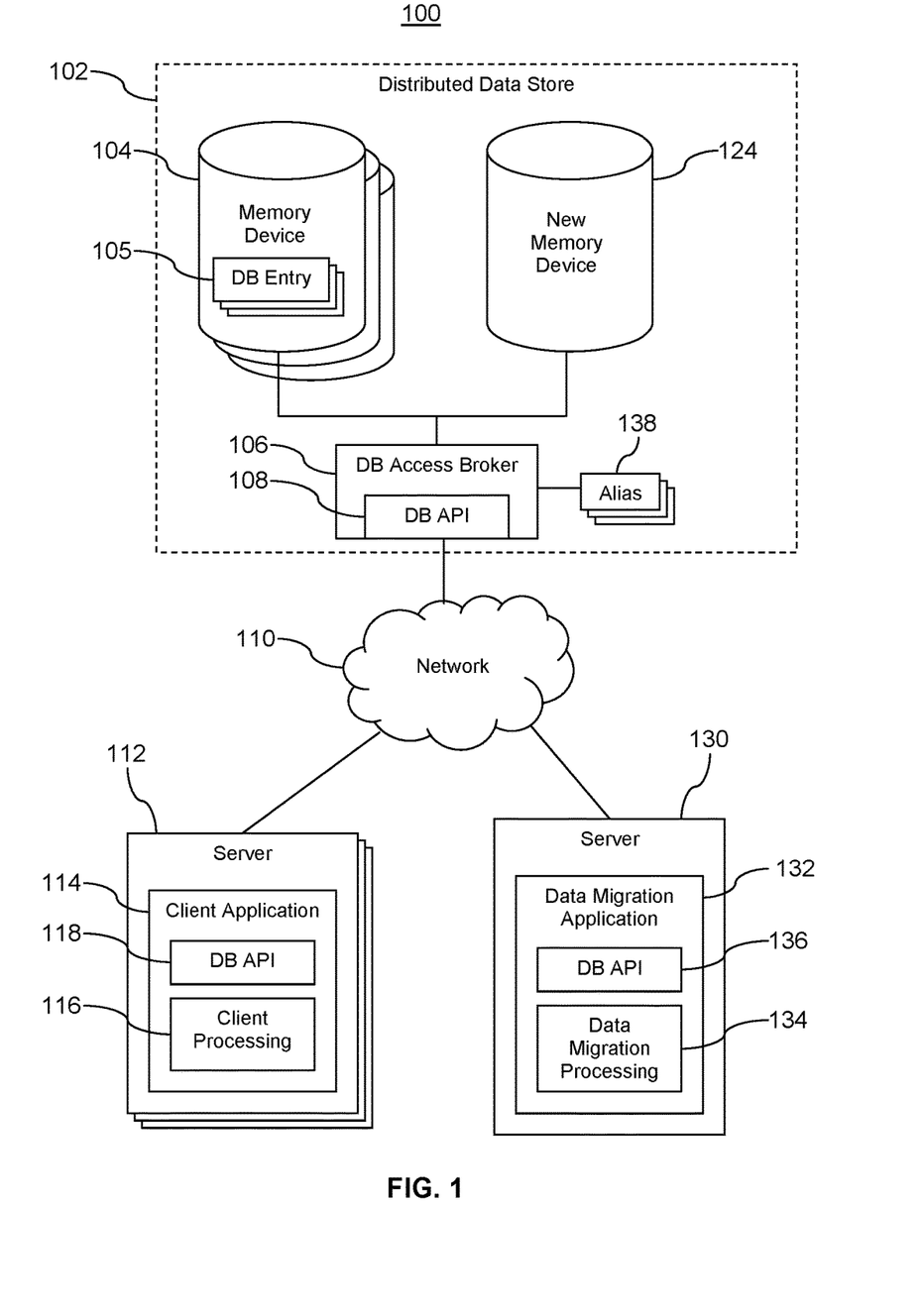
FIG. 1 is a block diagram of a system according to an embodiment of the disclosure.

Turning now to FIG. 1, a system 100 is described. In an embodiment, the system 100 comprises a distributed data store 102 that comprises a plurality of memory devices 104 comprising data entries 105 and a data store access broker 106 that provides a data store application programming interface (API) 108. Access to the memory devices 104 and their data entries 105 is mediated by the data store access broker 106 that extends the API 108 for use by client applications and other applications. In an embodiment, the memory devices 104 may be disk drives but in another embodiment, a different form or different kind of memory devices may be used to implement the distributed data store 102. In an embodiment, a mix of different kinds of memory devices may be used to implement the distributed data store 102.

The system 100 further comprises a network 110 and a plurality of sever computers 112. The network 110 comprises one or more public networks, one or more private networks, or a combination thereof. One or more client applications 114 execute on each server 112. The client application 114 comprises client application processing instructions 116 and a client data store API 118. The client data store API 118 may be a local instantiation of the data store API 108 or a local instantiation of method calls offered by the data store API 108. By executing methods provided by the data store API 108, for example by executing methods in the client data store API 118 compiled or linked into the client application 114, the client application processing instructions 116 is able to write to entries 105 and read from entries 105 in the distributed data store 102 via the mediation of the data store access broker 106 and the data store API 108 that it extends.

While the teachings of this disclosure are general and may apply to any distributed data store, in an embodiment, the distributed data store 102 stores tens of millions of entries 105 that represent wireless communication service subscriber accounts. In this embodiment, the client applications 114 may access the entries 105 to authenticate and/or authorize wireless communication service subscriber requests for wireless communication service, for example to originate a phone call or to conduct a data session pursuant to browsing the Internet. If the client processing 116 confirms, by reading an entry 105 from the distributed data store 102, that the subscriber is a subscriber in good standing and is authorized to receive the requested communication service, the client processing 116 grants the requested communication service request and refuses the service request if the subscriber is not in good standing or is not authorized. In this embodiment, the data store access broker 106 may receive more than 250,000 data access requests per second in peak usage periods. In an embodiment, the distributed data store 102 is implemented as a light-weight directory access protocol (LDAP) data store, and the data store access broker 106 provides LDAP API methods via the data store API 108.

From time to time it may be desirable to add a new memory device 124 to the distributed data store 102. The new memory device 124 may be added to expand the memory capacity of the distributed data store 102 as the total number of entries 105 increases (e.g., as new wireless communication subscribers are brought on-board in the example use case described above). The new memory device 124 may be added to replace a memory device 104 that is being taken out of service or being decommissioned because it has arrived at the end of its service life or is experiencing failures. It is understood that when adding new memory devices 124 one, two, or more than two new memory devices 124 may be added at about the same time to the distributed data store 102.

In some circumstances adding a new memory device 124 is associated with moving at least some entries 105 from one or more of the memory devices 104 to the one or more new memory devices 124. In some contexts, the memory device from which entries 105 are moved may be referred to as a source memory device, and the memory device to which entries 105 are moved may be referred to as a target memory device. Moving entries 105 from a source device to a target device may be referred to as migrating the entries 105 from the source device to the target device. In an embodiment, the system 100 further comprises a data migration server 130 that executes a data migration application 132. The data migration application 132 comprises data migration processing instructions 134 and a client data store API 136 that is compiled into or linked into the data migration application 132. By invoking methods of the client data store API 136, the data migration processing instructions 134 is able to write to entries 105 and read from entries 105 in the distributed data store 102 via the mediation of the data store access broker 106 and the data store API 108 that it extends. More particularly, by invoking methods of the client data store API 136, the data migration processing instructions 134 are able to migrate one or more entries 105 from one or more source memory devices to one or more target memory devices. The servers 112, the data migration server 130, and the data store access broker 106 may be implemented as computer systems. Computer systems are described further hereinafter.

In practice, it is common that a great many entries 105 are migrated from source memory devices to target memory devices. For example, the data migration application 132 may be tasked with migrating about 10 million, about 15 million, about 20 million, about 30 million, or some other number of data entries 105 from source memory devices to target memory devices. To promote timely and efficient migration of entries 105, the data migration application 132 may launch a number of concurrent migration threads, where each migration thread is responsible for migrating one data entry 105 from the source memory device to the target memory device. When a migration thread completes its task, it dies or self-terminates. The data migration application 132 monitors death of the migration threads and spawns new migration threads as appropriate to complete the desired migration of entries 105. In an embodiment, the data migration application 132 may keep about a hundred migration threads executing concurrently, about two hundred threads, about five hundred threads, about one thousand threads, or some other number of migration threads executing concurrently. Each thread may be assigned a data entry 105 to be migrated by the data migration application 132 based on a data migration map that identifies entries to be migrated. The data migration map may identify a data entry 105 in the source memory device and a location for the data entry 105 to be moved to in the target memory device. After a data entry 105 has been migrated, the corresponding record or entry in the data migration map may be deleted or marked as completed.

The data migration application 132 (or the data migration processing instructions 134) may migrate an entry 105 from a source memory device to a target memory device in an atomic transaction. As used herein, an atomic transaction means that the migration of the data entry is performed in such a way that a multi-step migration process is either completely performed to realize a new self-consistent state of the distributed data store 102 or the migration is not performed and any in-progress steps are rolled back, leaving the distributed data store 102 and the subject entry 105 in the state it was in before the start of the atomic transaction. During the migration of the entry 105, the data migration application 132 sets a soft lock on the entry 105 in the distributed data store 102 using the client data store API 136 and/or the data store API 108. If a client application 114 requests write access to the subject entry 105 while the entry 105 is in a soft lock state, the data store API 108 will inform the data migration application 132 of a pending request to access the entry 105, for example by generating an interrupt on the data migration server 130 or in the data migration application 132. In an embodiment, if a client application 114 requests read access to the subject entry 105 while the entry 105 is in a software lock state, the client application 114 read request is unaffected. The data migration application 132 will suspend its on-going activities to migrate the subject entry 105 and release the soft lock, and the data store API 108 will then process the request of the client application 114 to access the entry 105. After releasing the soft lock, the data migration application 132 performs any clean-up activity related to the interrupted migration, for example deleting an uncommitted clone of the entry 105 written to the target memory device and any other steps to roll back the interrupted transaction. The data migration application 132 will reattempt to migrate the data entry 105 again later.

If the data migration application 132 is not interrupted, it reads the entry 105 to be migrated using the data store API 108 and it clones the entry 105 in a shadow journal or other form of uncommitted memory in the target memory device. For example, the data migration application 132 initiates a transaction (e.g., an LDAP transaction) first and then reads the entry 105 in the memory device 104 and clones the entry 105 in a shadow journal area of the new memory device 124. In an embodiment, the data store access broker 106 maintains a plurality of aliases 138 that comprise references from an abstract name of the data entry 105 to a physical address of the data entry 105, for example a physical address that identifies both a specific memory device 104, 124 and a physical location or physical address within the subject memory device 104, 124. After cloning the entry 105 to the target memory device, the data migration application 132 remaps one or more aliases 138 that refer to the entry 105. For example, the data migration application 132 remaps aliases 138 that formerly referred to physical addresses in the source memory device (e.g., the memory device 104) to instead refer to physical addresses in the target memory device (e.g., the new memory device 124).

In an embodiment, a plurality of aliases 138 map to or reference the same data entry 105. For example three or more different aliases 138 may map to or reference the same data entry 105. For example, five or more different aliases 138 may map to or reference the same data entry 105. For example eight or more different aliases 138 may map to or reference the same data entry 105. For example, ten or more different aliases 138 may map to or reference the same data entry 105. For example, twelve or more different aliases 138 may map to or reference the same data entry 105. In the case of a wireless communication service subscriber distributed data store, the different aliases 138 referencing the same data entry 105 (the same subscription account data entry) may be associated with different handles or indexes to the same data entry 105. For example, the data entry 105 may be referenced by a first alias 138 based on a phone number associated with the data entry 105; the data entry 105 may be referenced by a second alias 138 based on a first and last name of a subscriber associated with the data entry 105; the data entry 105 may be referenced by a third alias 138 based on a mobile equipment identity (MEID) associated with a mobile phone associated with the data entry 105; the data entry 105 may be referenced by a fourth alias 138 based on an arbitrary subscriber identity number assigned to the subscriber by the wireless communication service provider that is associated with the data entry 105; and so on. After cloning the entry 105 in the target memory device, the data migration application 132 spawns a plurality of concurrently executing alias remapping threads, where each alias remapping thread is responsible for remapping one alias 138 to the physical address of the entry 105 in the target memory device. For example, if every entry 105 is associated with ten aliases 138, ten alias remapping threads are spawned by the data migration application 132. If every entry 105 is associated with thirteen aliases 138, thirteen alias remapping threads are spawned by the data migration application 132.

When each of the remapping threads has completed its work, it terminates or self-destructs. Alternatively, when a remapping thread has completed work on migrating one data item, the remapping thread may pick up an additional migration data item to process. When all the remapping threads have terminated the data migration application 132 continues to complete the migration of the data entry 105 from the source memory device to the target memory device by committing the data entry 105 in the target memory device, for example by committing the data entry 105 in the shadow journal area of the target memory device. Committing the data entry on the target memory device happens with transaction commit closure. After committing the data entry 105, subsequent requests to access the data entry 105 from the client application 114 are performed by the data store access broker 106 on the data entry 105 stored in the target memory device, based on following the references of the aliases 138. The data entry 105 in the source memory device, however, remains in storage. The data migration application 132 then deletes the data entry 105 in the source memory device, and then the data migration thread that handled the migration of the subject data entry 105 terminates or self-destructs. It is to be remembered that a plurality of data migration threads may be executing concurrently, migrating a plurality of data entries 105 from one or more source memory devices to one or more target memory devices.

The process of migrating data entries 105 can be said to be performed on a non-interference basis with reference to the on-going use of the distributed data store 102 by the client applications 114. It will be appreciated that in some cases it would be impracticable or impossible to take the distributed data store 102 out of service for the duration of a large migration of data entries 105. For example, in the example use case of a wireless communication service subscriber distributed data store, taking the data store out of service while a massive data entry 105 migration is performed might entail suspending service for tens of millions of wireless communication service subscribers for multiple hours. The present disclosure teaches a system and method that performs such migrations of data entries 105 without interfering with providing normal data access services to the client applications 114. Additionally, remapping aliases 138 in parallel threads versus remapping aliases associated with a data entry 105 serially reduces the time duration of a data entry 105 migration and therefore reduces the risk of corrupting data entries 105 when an in-progress migration is interrupted and the soft lock is released.

Figure 2:
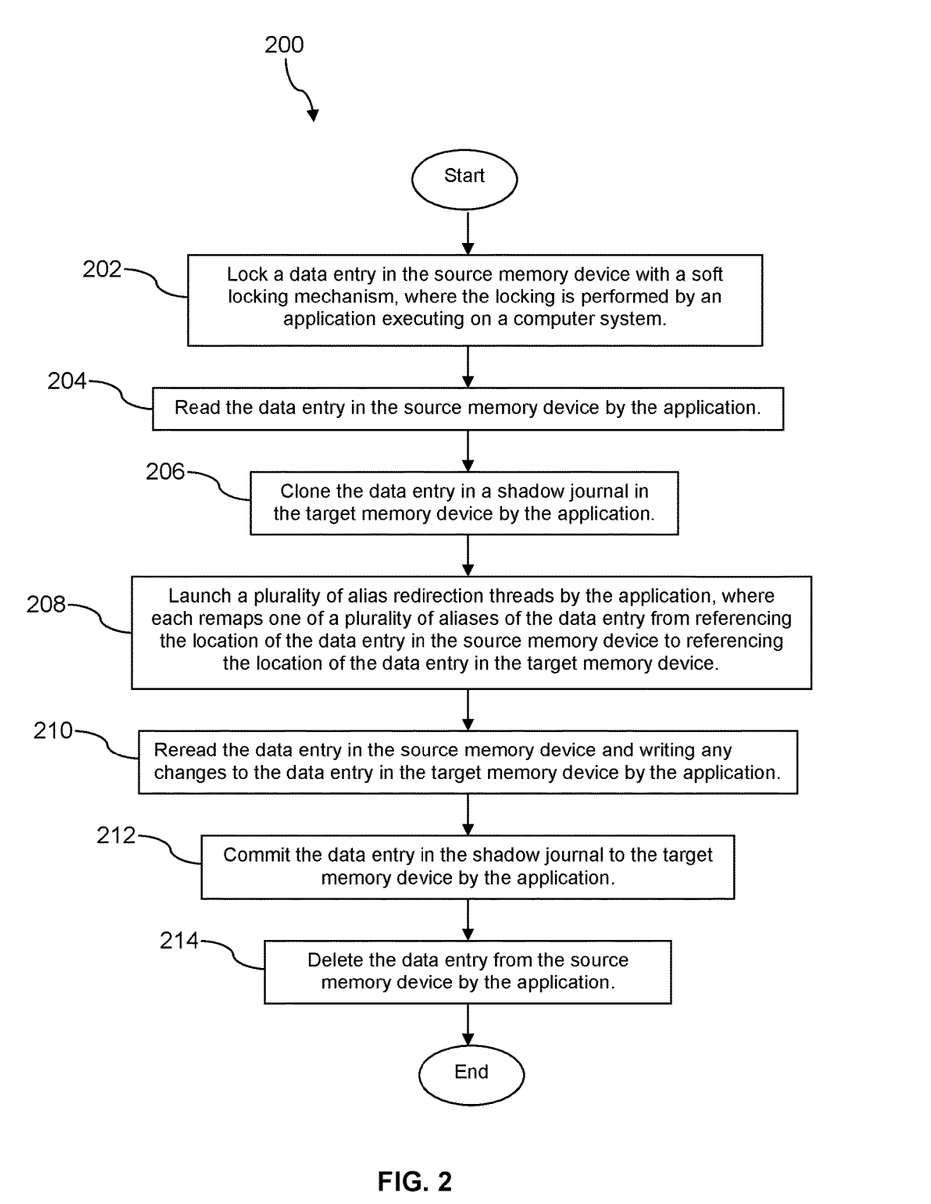
FIG. 2 is a flow chart of a method according to an embodiment of the disclosure.

Turning now to FIG. 2, a method 200 is described. The method 200 may be used for migrating a plurality of data entries stored in a distributed data store from a source memory device of the distributed data store to a target memory device of the distributed data store while the distributed data store is receiving client data access requests, for example on a non-interference basis. The method may be used to migrate data entries 105 from a source memory device to a target memory device, for example from a memory device 104 to a new memory device 124. At block 202, a data entry in the source memory device is locked with a soft locking mechanism, where the locking is performed by an application executing on a computer system. For example, a migration thread makes a call to the client data store API 136 (which in turn makes use of data store API 108) to engage the soft lock on the data entry. In an embodiment, before the data entry is locked in block 202, a transaction may be initiated, such as an LDAP transaction. At block 204, the data entry in the source memory device is read by the application. For example, the migration thread reads the data entry using the client data store API 136 (which in turn makes use of data store API 108). At block 206, the data entry is cloned in a shadow journal in the target memory device by the application. For example, the migration thread clones the data entry in the shadow journal in the target memory device using the client data store API 136 (which in turn makes use of data store API 108).

At block 208, a plurality of alias redirection threads is launched by the application, where each remaps one of a plurality of aliases of the data entry from referencing the location of the data entry in the source memory device to referencing the location of the data entry in the target memory device. As each alias redirection or remapping thread completes it terminates or destroys itself. At block 210, the data entry in the source memory device is reread and any change to the data entry is written in the target memory device by the application. For example, the migration thread rereads the data entry from the source device and writes any changes to the target memory device using the client data store API 136. It is understood that the processing of block 210 is optional and may be omitted in some embodiments. The processing of block 210 is directed at robustness, a "belt and suspenders" tactic, since the check at block 202 ought normally to be determinative and sufficient without the second check at block 210. At block 212, the data entry in the shadow journal is committed to the target memory device by the application. For example, the migration thread commits the data entry in the shadow journal using the client data store API 136. At block 214, the data entry is deleted from the source memory device by the application. For example, the migration thread deletes the data entry from the source memory device using the client data store API 136 and then terminates or picks up another data entry to be migrated. It is understood that the processing described above with reference to blocks 202 through 214 may be performed concurrently by a plurality of concurrently executing migration threads launched and controlled by the data migration application 132 and/or the data migration processing instructions 134.

Figure 3:
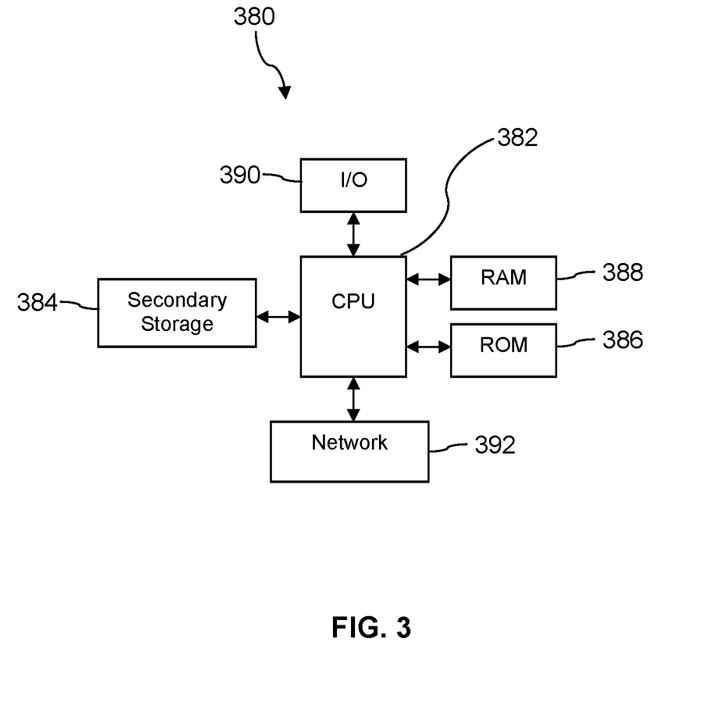
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of migrating a plurality of data entries stored in a distributed data store from a source memory device of the distributed data store to a target memory device of the distributed data store while the distributed data store is receiving client data access requests, comprising:
    locking a data entry in the source memory device with a soft locking mechanism, where the locking is performed by an application executing on a computer system, wherein the soft locking mechanism comprises a migration thread associated with the application releasing the lock on the data entry when a client that is different from the application requests one of a non-transactional update to the data entry or a transaction on the data entry, and wherein the migration thread is at least partially configured to migrate a data entry from the source memory device to the target memory device in an atomic transaction;
    reading the data entry in the source memory device by the application;
    cloning the data entry in a shadow journal in the target memory device by the application;
    launching a plurality of alias redirection threads by the application, where each remaps one of a plurality of aliases of the data entry from referencing the location of the data entry in the source memory device to referencing the location of the data entry in the target memory device; and
    committing the data entry in the shadow journal to the target memory device by the application.

2. The method of claim 1, wherein the distributed data store is a light-weight directory access protocol (LDAP) data store.

3. The method of claim 1, wherein the actions of locking the data entry, reading the data entry, cloning the data entry, processing the plurality of alias redirection threads, and committing the data entry in the shadow journal of the target memory device are performed by the application as an atomic transaction.

4. The method of claim 3, wherein the application performs a plurality of concurrent atomic transactions that each migrates a data entry from a source memory device to the target memory device.

5. The method of claim 4, wherein at least some of the concurrent atomic transactions migrate data entries from different source memory devices to the target memory device.

6. The method of claim 3, wherein when the application releases the lock on the data entry before committing the data entry to the shadow journal to the target memory device, the application deletes the data entry from the shadow journal.

7. The method of claim 1, further comprising, after committing the data entry in the shadow journal to the target memory device, deleting the data entry from the source memory device.

8. A data migration system, comprising:
a processor;
a non-transitory memory; and
an application stored in the non-transitory memory that, when executed by the processor, executes a plurality of distributed data store data entry migration threads, where at least some of the migration threads migrate a data entry from a source memory device to a target memory device in an atomic transaction in which the migration thread,
- locks the data entry in the source memory device with a soft locking mechanism, wherein the soft locking mechanism comprises the migration thread releasing the lock on the data entry when a client requests one of a non-transactional update to the data entry or a transaction on the data entry, where the client is different from the application,
- reads the data entry in the source memory device,
- clones the data entry in a shadow journal in the target memory device,
- launches a plurality of alias redirection threads that each remaps one of a plurality of aliases of the data entry from referencing the location of the data entry in the source memory device to referencing the location of the data entry in the target memory device, and
- if a client request to access the data entry has not been received, commits the data entry in the shadow journal to the target memory device.

9. The data migration system of claim 8, wherein the application remaps at least ten aliases of the data entry.

10. The data migration system of claim 8, wherein the application migrates data entries from a single source memory device to a plurality of target memory devices.

11. The data migration system of claim 8, wherein the application migrates data entries from a plurality of source memory devices to a single target memory device.

12. The data migration system of claim 8, wherein the distributed data store is a light-weight directory access protocol (LDAP) data store.

13. The data migration system of claim 8, wherein the application migrates data entries while the distributed data store is accessed by client applications different from the application executing on the processor.

14. The data migration system of claim 13, wherein the distributed data store comprises a telecommunications service provider subscriber data store.

15. A method of migrating a plurality of data entries stored in a distributed data store from a source memory device of the distributed data store to a target memory device of the distributed data store while the distributed data store is receiving client data access requests, comprising:
- locking a data entry in the source memory device with a soft locking mechanism, where the locking is performed by an application executing on a computer system, wherein the soft locking mechanism comprises a migration thread associated with the application releasing the lock on the data entry when a client that is different from the application requests one of a non-transactional update to the data entry or a transaction on the data entry, and wherein the migration thread is at least partially configured to migrate a data entry from the source memory device to the target memory device in an atomic transaction;
- reading the data entry in the source memory device by the application;
- cloning the data entry in a shadow journal in the target memory device by the application;
- launching a plurality of alias redirection threads by the application, where each remaps one of a plurality of aliases of the data entry from referencing the location of the data entry in the source memory device to referencing the location of the data entry in the target memory device;
- after remapping the aliases of the data entry, rereading the data entry in the source memory device and writing any changes to the data entry in the target memory device by the application; and
- after rereading the data entry in the source memory device, committing the data entry in the shadow journal to the target memory device by the application.

16. The method of claim 15, further comprising, after committing the data entry in the shadow journal to the target memory device, deleting the data entry from the source memory device by the application.

17. The method of claim 16, wherein deleting the data entry from the source memory is performed as an atomic transaction.

18. The method of claim 15, wherein the application releases the lock on the data entry if a client application requests to access the data entry in the source memory device.

19. The method of claim 18, wherein the application deletes the data entry from the shadow journal in the target memory device before it releases the lock on the data entry.

* * * * *